US012590666B2

(12) United States Patent
Phillips

(10) Patent No.: US 12,590,666 B2
(45) Date of Patent: Mar. 31, 2026

(54) COUPLING FOR INSULATED PIPING

(71) Applicant: AIRBUS OPERATIONS LIMITED, Bristol (GB)

(72) Inventor: Samuel Phillips, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 18/473,824

(22) Filed: Sep. 25, 2023

(65) Prior Publication Data

US 2024/0102600 A1     Mar. 28, 2024

(30) Foreign Application Priority Data

Sep. 28, 2022    (GB) ...................................... 2214209
Sep. 28, 2022    (GB) ...................................... 2214212

(51) Int. Cl.
*F16L 59/18*        (2006.01)
*F16L 23/12*        (2006.01)
(52) U.S. Cl.
CPC .............. *F16L 59/18* (2013.01); *F16L 23/12* (2013.01)
(58) Field of Classification Search
CPC ............................... F16L 59/184; F16L 39/005
See application file for complete search history.

(56) References Cited

U.S. PATENT DOCUMENTS

| | | | | |
|---|---|---|---|---|
| 3,068,026 A | * | 12/1962 | Mckamey ............. | F16L 39/005 62/50.7 |
| 3,095,220 A | * | 6/1963 | Pierce ................... | F16L 59/184 285/302 |
| 3,146,005 A | * | 8/1964 | Peyton .................. | F16L 59/184 285/365 |

(Continued)

FOREIGN PATENT DOCUMENTS

| | | |
|---|---|---|
| CN | 201348106 Y | 11/2009 |
| CN | 102155597 A | 8/2011 |

(Continued)

OTHER PUBLICATIONS

European Search Report for EP 23200091.9, four pages, dated Dec. 18, 2023.

(Continued)

*Primary Examiner* — Matthew Troutman
*Assistant Examiner* — Fannie Kee
(74) *Attorney, Agent, or Firm* — Nixon & Vanderhye, PC

(57) ABSTRACT

A coupling for insulated piping is disclosed having first and second parts for forming the coupling. The first and second parts include an inner conduit portion for fluid communication with an inner tube of an insulated pipe and an outer conduit portion, the inner conduit portion and outer conduit portion forming therebetween a space for fluid communication with the insulating part of an insulated pipe. In use, cold liquid is transported in the inner conduit portions. The first and second parts comprise flanges. The inner conduit portion of the first part has a projection comprising a lower thermal (Continued)

expansion region. The second part has a projection-receiving portion for receiving the projection of the first part, the projection-receiving portion having a co-efficient of thermal expansion that is greater than the lower thermal expansion region of the projection.

14 Claims, 7 Drawing Sheets

(56)                References Cited

U.S. PATENT DOCUMENTS

| | | | | |
|---|---|---|---|---|
| 4,011,732 | A | * | 3/1977 | Doherty ............... F16L 39/005 62/50.7 |
| 4,108,476 | A | * | 8/1978 | Krupp ................... F16L 59/184 285/47 |
| 4,491,347 | A | | 1/1985 | Gustafson |
| 5,628,517 | A | | 5/1997 | Jia |
| 7,052,047 | B1 | * | 5/2006 | Box et al. ............. F16L 39/005 285/123.15 |
| 7,427,084 | B1 | * | 9/2008 | Betz ...................... F16L 39/005 285/123.17 |
| 8,308,200 | B1 | | 11/2012 | Barnes et al. |
| 8,820,794 | B1 | * | 9/2014 | Betz ...................... F16L 39/005 285/123.6 |
| 2004/0055642 | A1 | | 3/2004 | Valentian |
| 2009/0261578 | A1 | | 10/2009 | Lange et al. |
| 2010/0024911 | A1 | * | 2/2010 | Menardo ............... F16L 59/184 138/112 |
| 2012/0217739 | A1 | * | 8/2012 | Weinhold .............. F16L 39/005 285/121.2 |
| 2013/0161940 | A1 | * | 6/2013 | Rossato ................ F16L 39/005 285/62 |
| 2021/0061640 | A1 | | 3/2021 | Umemura et al. |
| 2021/0207759 | A1 | | 7/2021 | Schulz et al. |
| 2021/0278028 | A1 | | 9/2021 | Schulz et al. |
| 2022/0403968 | A1 | * | 12/2022 | Phillips ................. F16L 39/005 |
| 2023/0139421 | A1 | | 5/2023 | Pedoussaut et al. |
| 2023/0228363 | A1 | * | 7/2023 | Phillips ................. F16L 59/184 285/47 |

FOREIGN PATENT DOCUMENTS

| | | | |
|---|---|---|---|
| CN | 110107756 | A | 8/2019 |
| CN | 213776847 | U | 7/2021 |
| DE | 4005303 | A1 | 8/1991 |
| EP | 2 957 805 | A1 | 12/2015 |
| EP | 4174357 | | 5/2023 |
| FR | 2574524 | A1 | 6/1986 |
| FR | 3119007 | | 7/2022 |
| GB | 1 567 373 | | 5/1980 |
| GB | 2166514 | A | 5/1986 |
| GB | 2241035 | A | 8/1991 |
| JP | 2007-332992 | A | 12/2007 |
| JP | 2016-180467 | A | 10/2016 |
| KR | 10-2017-0059269 | A | 5/2017 |
| WO | 2007065492 | | 6/2007 |
| WO | 2016051770 | A1 | 4/2016 |

OTHER PUBLICATIONS

Search Report for GB2214209.5 dated Mar. 16, 2023, 1 page.
ACME Cryogenics, Field Joint Connector, <https://www.acmecryo.com/products/vacuum-jacketed-pipesystems/vacuum-jacketed-piping-application-specific-accessories/field-joint-connector/> , 6 pages.
Vaccuum Insulated Pipe—Dissimilar Metal Bayonet Connections, Description of bayonet coupling available Oct. 2021, according to the Internet Archive <https://web.archive.org/web/20211025181458/https:/files.chartindustries.com/10667491_VIPbayonet.pdf>, obtained Dec. 20, 2022, 2 pages.
Search Report for Application No. GB2200666.2, two pages, dated Jun. 9, 2022.
Partial European Search Report for Application No. EP 23 15 2068, one page, dated Jul. 27, 2023.

* cited by examiner

COUPLING FOR INSULATED PIPING

CROSS RELATED APPLICATION

This application claims priority to United Kingdom Patent Applications GB 2214209.5, filed Sep. 28, 2022, and GB 2214212.9, filed Sep. 28, 2022, the entire contents of each of which are hereby incorporated by reference.

BACKGROUND OF THE INVENTION

The present disclosure relates to couplings for insulated piping.

The present invention concerns couplings for coupling insulated piping, optionally vacuum-insulated piping. More particularly, but not exclusively, this invention concerns a coupling for insulated piping, such as vacuum-insulated piping. The invention also concerns a kit for forming a coupling, first and second parts for forming such a coupling, an insulated piping arrangement, a fuel-delivery arrangement, a vehicle comprising an insulated piping arrangement and/or a fuel-delivery arrangement and a method of supplying a chilled liquid fuel.

Rigid couplings in insulated piping, such as vacuum-insulated piping, (also known as 'Vacuum Jacketed' or 'Super Insulated') are typically based on plain bolted flanges with compressible seals, clamped V-flanges with compressible seals, or vacuum insulated 'bayonet' couplings.

Insulated pipes are double-walled pipes that are typically used to carry cold fluids (typically liquids). The cold fluid is carried in a central conduit. An outer annular region surrounds the central conduit, and provides thermal insulation for the central conduit. A solid insulative material may be provided in the outer annular region. In a vacuum-insulated pipe, the outer annular region is at a low pressure. In certain cases, air is removed from the pipe to provide the low-pressure region during pipe manufacture. In other cases, air may be continuously removed from the pipe using a vacuum pump to provide the low-pressure region. Sections of pipe are typically connected together using a two-part pipe coupling, which may comprise plain bolted flanges with compressible seals, clamped V-flanges with compressible seals, or vacuum insulated 'bayonet' couplings.

Such couplings typically comprise metal and therefore provide a potential point of thermal ingress to the cold fluid carried in the central conduit. Heating of the cold fluid is undesirable. Furthermore, such couplings connect two sections of pipe and it is therefore desirable for the couplings to be strong, and to resist unwanted deformation of the pipe.

Bayonet couplings are less susceptible to thermal ingress problems compared to flanged couplings, but are heavy and expensive. Furthermore, such bayonet couplings need to be handled and installed carefully. Bayonet couplings are also typically relatively long, and therefore may not be suitable for providing joins in pipes with bends or junctions (such as T-junctions).

The present invention seeks to mitigate the above-mentioned problems. Alternatively or additionally, the present invention seeks to provide an improved coupling for insulated piping.

SUMMARY OF THE INVENTION

The present invention provides a coupling for insulated piping, the coupling comprising:
first and second parts for forming the coupling;

each of the first and second parts comprising an inner conduit portion for fluid communication with an inner tube of an insulated pipe and an outer conduit portion, the inner conduit portion and outer conduit portion forming therebetween a space for fluid communication with the insulating part of an insulated pipe;

the inner conduit portions of the first and second parts being suitable for forming an inner region for the passage of fluid therethrough;

each of the first and second parts comprising a flange for connecting the first and second parts, the inner conduit portion of the first part comprising a projection comprising a lower thermal expansion region having a first co-efficient of thermal expansion; and the second part comprising a projection-receiving portion for receiving the projection of the first part, the projection-receiving portion having a second co-efficient of thermal expansion, the second co-efficient of thermal expansion being greater than the first co-efficient of thermal expansion.

The applicant has discovered that it is possible to form a coupling with enhanced engagement when cold liquid, such as liquid hydrogen, is passed through the inner conduit portions.

The coupling is optionally not a bayonet coupling. The term "lower thermal expansion region" is used to facilitate identification of said region and to indicate that it has a lower co-efficient of thermal expansion than the projection-receiving region.

The projection and projection-receiving portion are configured so that the projection-receiving portion engages the projection when cooled to temperatures associated with the passage of cold liquid through the inner conduit portions. Such temperatures will optionally be no more than 0° C., optionally no more than −50° C., optionally no more than −100° C., optionally no more than −150° C., optionally no more than −200° C., optionally no more than −250° C., and optionally no more than −260° C., and optionally no less than −100° C., optionally no less than −150° C., optionally no less than −200° C. and optionally no less than −260° C. For example, the projection and projection-receiving portion are configured so that the projection-receiving portion engages the projection when cooled to temperatures associated with the passage of liquid nitrogen, liquid oxygen or liquid hydrogen through the inner conduit portions.

The projection-receiving portion may optionally comprise steel. The coefficient of thermal expansion of the projection-receiving portion may optionally be at least $5 \times 10^{-6} \mathrm{K}^{-1}$, optionally at least $8 \times 10^{-6} \mathrm{K}^{-1}$, and optionally at least $1 \times 10^{31}$ $_5 \mathrm{K}^{-1}$.

The lower thermal expansion region of the projection may optionally be formed from a low thermal expansion material, such as Invar or a suitable polymer. The lower thermal expansion region may optionally have a coefficient of thermal expansion of no more than $2 \times 10^{-6} \mathrm{K}^{-1}$, optionally of no more than $1.5 \times 10^{-6} \mathrm{K}^{-1}$, and optionally no more than $1.0 \times 10^{-6} \mathrm{K}^{-1}$.

The projection may optionally be proximate to the flange of the first part. For example, the first part may comprise an interface region for forming an interface with a corresponding interface region of the second part. The interface region of the first part may comprise the flange of the first part. The interface region of the first part may be substantially planar. The projection may optionally be proximate to the interface region of the first part. The projection may optionally project from the interface region of the first part.

The projection-receiving portion may optionally be proximate to the flange of the second part. For example, the second part may optionally comprise an interface region for forming an interface with a corresponding interface region of the first part. The interface region of the second part may optionally comprise the flange of the second part. The interface region of the second part may optionally be substantially planar. The projection-receiving portion optionally extends from the interface region of the second part, optionally rearwardly, if the direction the interface region faces defines a forwards direction.

The inner conduit portion of the second part may optionally comprise the projection-receiving portion. The inner conduit portion of the second part may optionally comprise a non-receiving portion that does not receive the projection. The projection-receiving portion may optionally be cylindrical. The cross-sectional area, diameter and/or shape of the projection-receiving portion may optionally be the same, or different from, that of the non-receiving portion. For example, the diameter of the projection-receiving portion may optionally be greater than that of the non-projection receiving portion. This may be the case, for example, if the diameter of the projection is the same as the non-receiving portion, and/or if the diameter of the projection is the same as that of the non-projecting portion of the inner conduit portion of the first part.

The cross-sectional area, diameter and/or shape of the projection may optionally be the same as, or different from, that of the non-projection portion of the inner conduit portion of the first part. For example, the diameter of the projection may optionally be the same as that of the non-projection portion of the inner conduit portion of the first part. For example, the diameter of the projection may optionally be different from that of the non-projection portion of the inner conduit portion of the first part.

As mentioned above, the inner conduit portion of the first part comprises a projection comprising a lower thermal expansion region having a first co-efficient of thermal expansion. The lower thermal expansion region may optionally provide an end or tip portion of the projection. In this case, the projection may optionally comprise a base portion, in which case the base portion may optionally comprise a material different from the end or tip portion, said material having a thermal co-efficient of thermal expansion that is greater than the lower thermal expansion region. The lower thermal expansion region may optionally comprise substantially the entire projection. The tip portion may optionally have a length of at least 2 mm, optionally at least 5 mm, optionally at least 10 mm and optionally at least 20 mm. The tip portion may optionally have a length of no more than 100 mm, optionally no more than 80 mm, optionally no more than 60 mm, optionally no more than 50 mm, optionally no more than 40 mm, optionally no more than 30 mm, optionally no more than 20 mm and optionally no more than 10 mm.

Optionally, the projection optionally has a length of at least 2 mm, optionally at least 5 mm, optionally at least 10 mm and optionally at least 20 mm. The projection may optionally have a length of no more than 100 mm, optionally no more than 80 mm, optionally no more than 60 mm, optionally no more than 50 mm, optionally no more than 40 mm, optionally no more than 30 mm, optionally no more than 20 mm and optionally no more than 10 mm.

The length of the projection-receiving portion is commensurately sized to accommodate the projection.

As mentioned above, each of the first and second parts may comprise an interface portion for forming an interface with an interface portion of the other part. The respective interface portion may optionally comprise the respective flange. Each interface portion may also optionally comprise an interface second portion located inwards of the flange.

Optionally, the interface portion extends radially outwards from the interface second portion to the flange.

The coupling is optionally a coupling for vacuum-insulated piping. The inner conduit portion of each of the first and second parts would be for fluid communication with an inner part of a vacuum-insulated pipe. The space between the inner conduit portion and the outer conduit portion of each of the first and second parts would be for forming fluid communication with an outer, low-pressure part of a vacuum-insulated pipe.

The interface second portion may optionally be proximate to, and optionally outward of, the inner conduit portion for fluid communication with an inner part of an insulated pipe. The interface second portion may optionally comprise a portion of reduced conductive cross-section. The portion of reduced conductive cross-section reduces thermal conduction between the flange and the fluid carried by the coupling. The interface second portion may optionally comprise a wall, optionally an annular wall. The portion of reduced conductive cross-section may optionally comprise one or more recesses or apertures in the interface second portion. One or more of the recesses or apertures may optionally be provided with a solid, thermally-insulative material. Such thermally-insulative material may provide strength and/or rigidity to the coupling.

The inner conduit portion is optionally for interfacing with an inner tube of an insulated pipe. The inner conduit portion may optionally be configured to receive, or be received by, an inner tube of an insulated pipe. Alternatively, the inner conduit portion may optionally be configured to abut an inner tube of an insulated pipe. In use, fluid flows through the inner conduit portion. The inner conduit portion optionally extends orthogonal to the flange. Such an arrangement may facilitate attachment of the inner conduit portion to an inner tube of an insulated pipe. The inner conduit portion and the outer conduit portion optionally define a space for interfacing with an insulative region of an insulated pipe. The space may optionally be annular is cross-section. The outer conduit portion may optionally be configured to receive an outer tube of an insulated pipe. The outer conduit portion may optionally be configured to abut an outer tube of an insulated pipe.

The coupling optionally comprises a first seal-forming member. One of the first and second parts is optionally provided with the first seal-forming member. The first seal-forming member may be annular in shape. The first seal-forming member may be located outward of the inner conduit portion, and optionally inward of the outer conduit portion. In use, the first seal-forming member optionally inhibits egress of liquid carried in the inner portion of an insulated pipe.

The coupling optionally comprises a second seal-forming member. One of the first and second parts is provided with the second seal-forming member. Optionally, one of the first and second parts is provided with both the first and second seal-forming members. The second seal-forming member may optionally be located outwards of the outer conduit portion, and optionally outwards of the thermally-conductive portion (if present).

The flange(s) may be provided with a plurality of apertures for the receipt of fasteners, such as bolts. The plurality of apertures may be spaced around said flange, optionally substantially evenly around said flange. The flange may extend laterally from the respective first or second part. The flange may extend substantially orthogonal to a longitudinal axis of the respective first or second part.

The coupling may be provided with thermal insulation around at least part of the first and second parts of the coupling. Thermal insulation may be provided around substantially both of the first and second parts of the coupling.

The first and second parts may be provided with apertures or passages that together provide one or more flow paths between the spaces between the inner and outer conduit portions. This facilitates the removal of gas from those spaces of the first and second parts using a single vacuum pump or other means for reducing pressure, if the coupling is for use with vacuum-insulated piping.

The interface portions of the first and second parts may comprise a substantially flat face portion. The substantially flat face portions may be urged together in the coupling.

In accordance with a second aspect of the present invention, there is provided a first and/or second part of a coupling for use in the coupling of the first aspect of the present invention.

In accordance with a third aspect of the present invention, there is provided a kit for forming a coupling in accordance with the first aspect of the present invention, the kit comprising first and second parts of a coupling for use in the coupling of the first aspect of the present invention. The first and second parts of the coupling may comprise those features described above in relation to the couplings of the first aspect of the present invention.

In accordance with a fourth aspect of the present invention, there is provided an insulated pipe comprising a first or second part of a coupling in accordance with the first aspect of the present invention.

The insulated pipe may be a vacuum-insulated pipe. The insulated pipe optionally comprises an inner pipe for the carriage of a fluid, optionally a cold fluid, and an outer pipe in which there is reduced pressure. Optionally, the first or second part of the coupling is attached or otherwise connected to the insulated pipe. Alternatively, the first or second part of the coupling may be integral with the insulated pipe. Those skilled in the art will realise that the reduced pressure region in an insulated pipe is not at a true vacuum. The pressure is sufficiently reduced so as to inhibit transfer of heat from the ambient environment to the fluid carried in the inner pipe. The inner pipe may be interfaced (or integral) with the inner conduit portion of the first and/or second part of the coupling. The inner pipe may be in fluid communication with the inner conduit portion of the coupling. There may be overlap between the inner conduit portion and the inner pipe. Such overlap may permit attachment of the coupling to the insulated pipe. The outer pipe of the insulated pipe may be interfaced (or integral) with the sleeve. There may be overlap between the sleeve and the outer pipe. Such overlap may permit attachment of the coupling to the insulated pipe.

The inner pipe and the outer pipe of the insulated pipe may define a region that is, in use, subject to a low pressure. This low pressure region is optionally in fluid communication with the space in the coupling between the inner conduit portion and the outer conduit portion.

The insulated pipe of the fourth aspect of the present invention may comprise more than one first part and/or second part of a coupling in accordance with the second aspect of the present invention. For example, a first connecting region of the insulated pipe may comprise a first or second part of a coupling in accordance with the second aspect of the present invention, and a second connecting region of the insulated pipe may comprise a first or second part of a coupling in accordance with the second aspect of the present invention. A third connecting region of the insulated pipe may be comprise a first or second part of a coupling in accordance with the second aspect of the present invention, for example, if the insulated pipe is in the form of a T-shape In accordance with a fifth aspect of the present invention, there is provided an insulated piping arrangement comprising first and second insulated pipes connected by a coupling in accordance with the first aspect of the present invention. The piping arrangement may be a vacuum-insulated piping arrangement comprising first and second vacuum-insulated pipes. The insulated piping arrangement of the fourth aspect of the present invention may comprise any of the features described above in relation to the first to seventh aspects of the present invention.

In accordance with a sixth aspect of the present invention, there is provided a kit for forming an insulated pipe in accordance with the fourth aspect of the present invention or an insulated piping arrangement in accordance with the fifth aspect of the present invention, the kit comprising one or more lengths of insulated pipe and at least one first and/or second part of a coupling in accordance with the first aspect of the present invention. The kit may be for forming a vacuum-insulated pipe, and may comprise one or more lengths of vacuum-insulated pipe.

In accordance with a seventh aspect of the present invention, there is provided a fuel delivery arrangement comprising one or more fuel tanks configured to deliver fuel to an engine or motor through an insulated piping arrangement (optionally a vacuum-insulated piping arrangement) according to the fifth aspect of the present invention. The fuel may be a liquefied gas, such as hydrogen.

In accordance with an eighth aspect of the present invention, there is provided a vehicle comprising an insulated piping arrangement (optionally a vacuum-insulated piping arrangement) in accordance with the fifth aspect of the present invention and/or a fuel delivery arrangement according to the seventh aspect of the present invention. The vehicle may be land-based vehicle, such as an automobile, van, truck, lorry, bus, motorbike, tram or train. The vehicle may be an aircraft, such as a fixed-wing aircraft or a rotary aircraft.

In accordance with a ninth aspect of the present invention, there is provided a method of supplying a chilled liquid fuel, the method comprising passing said chilled liquid fuel through a coupling in accordance with the first aspect of the present invention, an insulated pipe (optionally a vacuum-insulated pipe) in accordance with the fourth aspect of the present invention, an insulated piping arrangement (optionally a vacuum-insulated piping arrangement) in accordance with the fifth aspect of the present invention or a fuel delivery arrangement of the seventh aspect of the present invention. The chilled liquid fuel may comprise liquid hydrogen.

It will, of course, be appreciated that features described in relation to one aspect of the present invention may be incorporated into other aspects of the present invention. For example, the method of the invention may incorporate any of the features described with reference to the apparatus of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
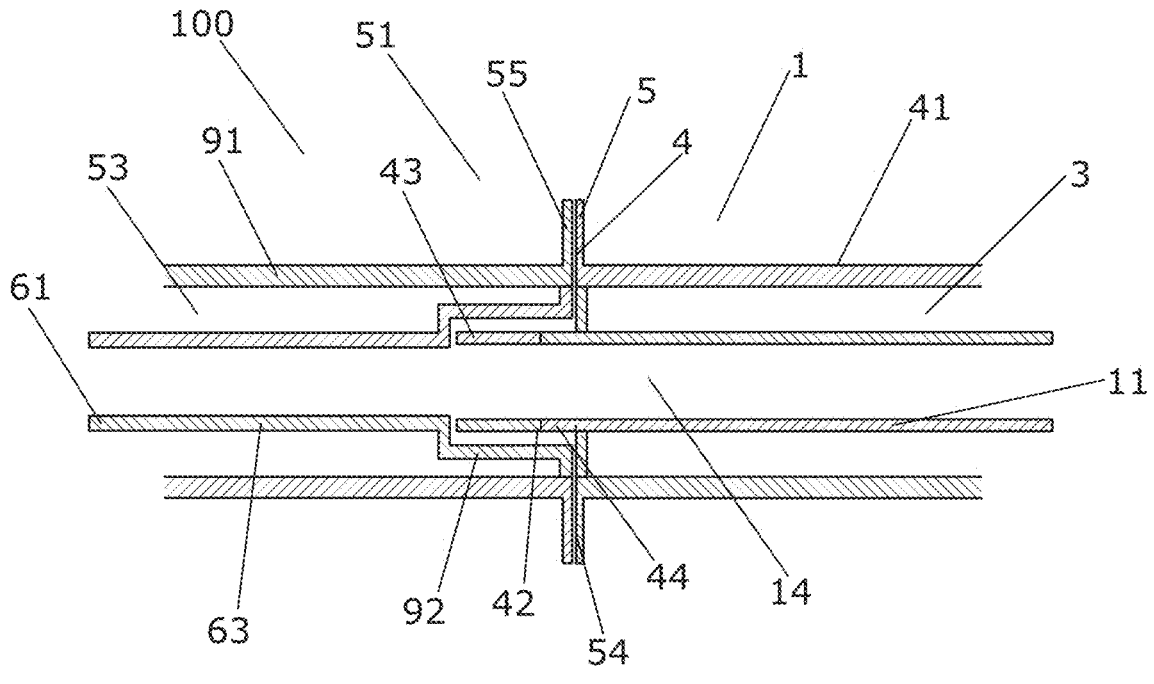
FIG. 1 shows a schematic cross-sectional view of a coupling according to a first embodiment of the invention.

An embodiment of a coupling in accordance with the first aspect of the present invention will now be described by way of example only with reference to FIG. 1. The coupling is denoted generally by reference numeral 100 and is suitable for coupling insulated piping, in this case, vacuum-insulated piping. The coupling 100 comprises first 1 and second 51 parts for forming the coupling. Each of the first 1 and second parts 51 comprises an inner conduit portion 11, 61 for interfacing with an inner pipe of a vacuum-insulated pipe and a space 3, 53 for interfacing with an outer, low-pressure part of a vacuum-insulated pipe. Space 3, 53 is formed between a respective inner conduit portion 11, 61 and an outer conduit portion 41, 91. The inner conduit portions 11, 61 of the first and second parts form an inner region 14 for the passage of fluid therethrough. In this connection, vacuum-insulated piping typically comprises an inner pipe that carries a fluid, usually a liquid, that should be kept cold, and an outer pipe. The space between the inner and outer pipe of the vacuum-insulated piping is typically at a reduced pressure to inhibit heat transfer from the ambient environment to the fluid in the inner pipe. The inner pipe of the vacuum-insulated piping interfaces with the inner conduit portions 11, 61 of the coupling so that fluid (for example, a cooled liquid, such as hydrogen) can be transferred through the coupling. The outer pipe of the vacuum-insulated pipe interfaces with the outer conduit portion of the coupling so that the space 3, 53 between the inner 11, 61 and outer 41, 91 conduit portions may be subjected to the same low pressure that is generated in the outer, low-pressure part of the vacuum-insulated piping.

Each of the first 1 and second 51 parts comprises an interface portion 4, 54 for forming an interface with the interface portion of the other of the first and second parts. In the present case, each interface portion 4, 54 has generally a generally flat face that contacts the generally flat face of the interface portion 4, 54 of the other of the first 1 and second 51 parts. Each interface portion 4, 54 comprises a flange 5, 55 for connecting the first 1 and second 51 parts. The flanges 5, 55 are generally annular in shape. The flanges 5, 55 abut one another, and each flange 5, 55 is provided with a plurality of apertures for the receipt of bolts. The flanges 5, 55 are approximately 5 mm thick.

The flat face of interface portion 4 of first part 1 is provided with an inner seal member (not shown) and an outer seal member (not shown), each being in the form of a cryogenically-compatible washer. Both the inner seal member and outer seal member are located in a respective annular groove (not shown) that has been formed in the flat face of interface portion 4. Both the inner seal member and outer seal member form a seal against the flat face of interface portion 54 of second part 51. First seal member is located outward of inner conduit portion 11 and inward of outer conduit portion 41, and inhibits leakage of fluid from inner portion 14. Second seal member is located outward of outer conduit portion 41, and inhibits ingress of air.

In the embodiment above, the coupling 100 is designed to interface with a 3.5″ (88.9 mm) diameter vacuum-insulated pipe.

Inner conduit portion 11 of first part 1 comprises a projection 42 that extends from the interface portion 4. Projection 42 is cylindrical, and comprises a tip portion 43 and a base portion 44. Tip portion 43 is substantially cylindrical in shape and is about 30 mm long, and is made from invar, a material having a low co-efficient of thermal expansion. Tip portion 42 has been welded to base portion 44. Base portion 44 is contiguous with the part of the inner conduit portion 11 that does not protrude from the interface region 4. The base portion 44 and the part of the inner conduit portion 11 that does not protrude from the interface region 4 are formed from steel. In use, projection 42 is received within a projection-receiving portion 92 provided in the second part 51. Projection-receiving portion 92 is substantially cylindrical in shape and is sufficiently large to accommodate projection 42. Projection-receiving portion 92 is formed from steel, which has a far greater co-efficient of thermal expansion than invar, from which the tip portion 43 of projection 42 is formed. Projection-receiving portion 92 is part of inner conduit portion 61, but has a greater diameter than the rear part 63 of inner conduit portion 61.

Before use, clamps are used to secure flanges 5, 55 together. This compresses inner and outer seal members, inhibiting egress of fluid from inner portion 14 and inhibiting ingress of ambient air.

As cold liquid, in this case, liquid hydrogen, is passed through inner portion 14, inner conduit portions 11, 61 cool and contract. Projection-receiving portion 92 has a far greater co-efficient of thermal expansion that tip portion 43, and therefore contracts far more than tip portion 43. This brings projection-receiving portion 92 into engagement with tip portion 43. This may increase the effectiveness of the seal between the first and second parts, inhibiting egress of fluid from inner region 14. This engagement also reduces the risk of the unwanted decoupling of the coupling.

Figure 2:
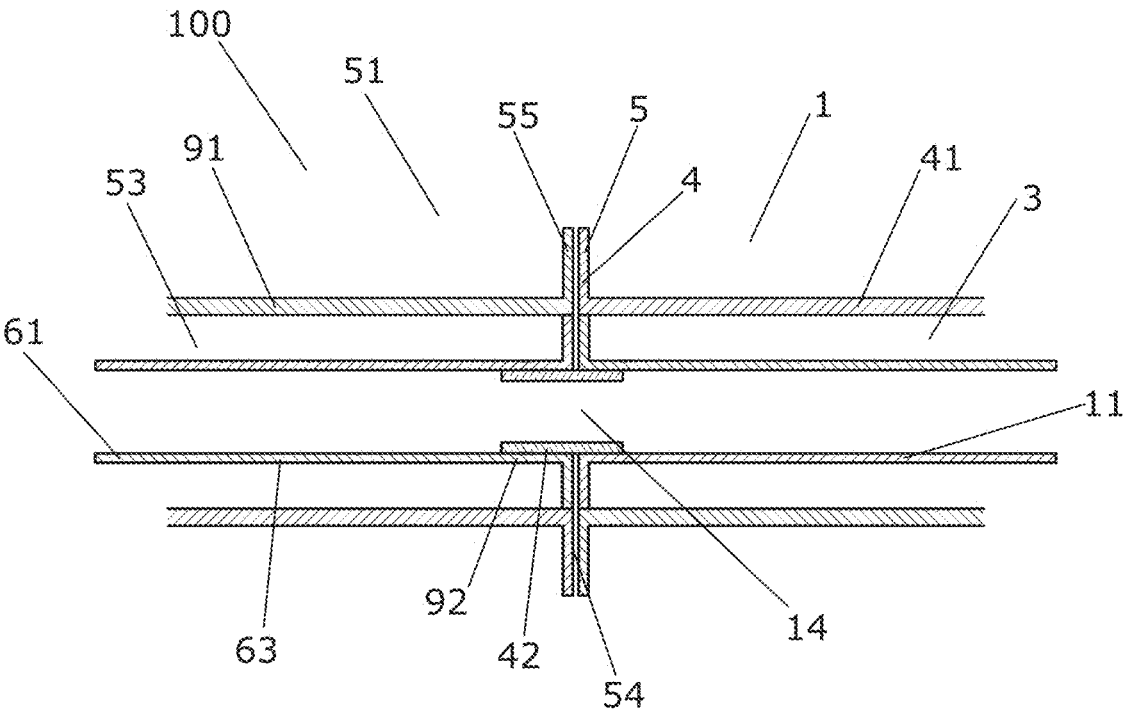
FIG. 2 shows a schematic cross-sectional view of a coupling according to a second embodiment of the invention.

FIG. 2 shows a further embodiment of a coupling in accordance with the present invention. The coupling of FIG. 2 is essentially that same as the coupling of FIG. 1, except for the arrangement of the projection 42 and projection-receiving portion 92. In this connection. Inner conduit portion 11 of first part 1 comprises projection 42 that is formed from a cylinder of invar that is welded to the internal surface of the rest of the inner conduit portion 11. Inner conduit portion 61 provides projection-receiving portion 92, which has the same cross-sectional area as the rest of the inner conduit portion 61. Projection 42 is received by projection-receiving portion 92 of inner conduit portion 61. As cold liquid, in this case, liquid hydrogen, is passed through inner portion 14, inner conduit portions 11, 61 cool and contract. Projection-receiving portion 92 has a far greater co-efficient of thermal expansion than projection 42, and therefore contracts far more than projection 42. This brings projection-receiving portion 92 into engagement with projection 42. This may increase the effectiveness of the seal between the first and second parts, inhibiting egress of fluid from inner region 14. This engagement also reduces the risk of the unwanted decoupling of the coupling.

Figure 3:
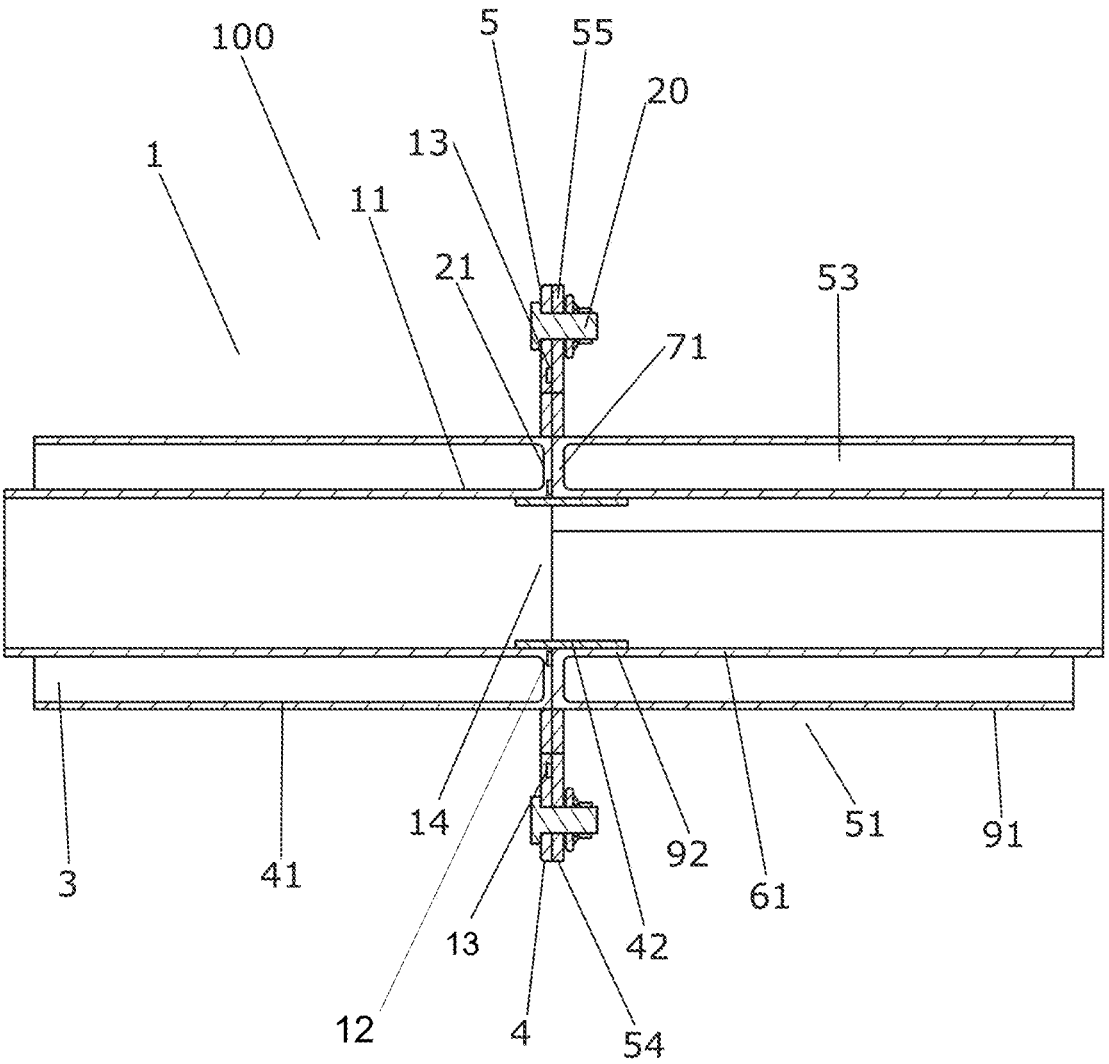
FIG. 3 shows a schematic cross-sectional view of a coupling according to another embodiment of the invention.

A further embodiment of a coupling in accordance with the first aspect of the present invention will now be described by way of example only with reference to FIGS. 3. The coupling is denoted generally by reference numeral 100 and is suitable for coupling insulated piping, in this case, vacuum-insulated piping. The coupling 100 comprises first 1 and second 51 parts for forming the coupling. Each of the first 1 and second parts 51 comprises an inner conduit portion 11, 61 for interfacing with an inner part of a vacuum-insulated pipe and a space 3, 53 for interfacing with an outer, low pressure part of a vacuum-insulated pipe. Spaces 3, 53 are formed between respective inner 11, 61 and outer 41, 91 conduit portions. The inner conduit portions 11, 61 of the first and second parts form an inner region 14 for the passage of fluid therethrough. In this connection, vacuum-insulated piping typically comprises an inner pipe that carries a fluid, usually a liquid, that should be kept cold, and an outer pipe. The space between the inner and outer pipe of the vacuum-insulated piping is typically at a reduced pressure to inhibit heat transfer from the ambient environment to the fluid in the inner pipe. The inner pipe of the vacuum-insulated piping interfaces with the inner conduit portions 11, 61 of the coupling so that fluid (for example, a cooled liquid, such as hydrogen) can be transferred through the coupling. The outer, low-pressure part of the vacuum-insulated pipe interfaces with the spaces 3, 53 of the coupling so that those spaces 3, 53 may be subjected to the same low pressure that is generated in the low-pressure part of the vacuum-insulated piping. For the avoidance of doubt, "outer portion" refers to the position of said portion relative to the "inner portion". The term "outer" does not refer to the position of the "outer portion" relative to features of the coupling other than the "inner portion".

Each of the first 1 and second 51 parts comprises an interface portion 4, 54 for forming an interface with the interface portion of the other of the first and second parts. In the present case, each interface portion 4, 54 has generally a generally flat face that contacts the generally flat face of the interface portion 4, 54 of the other of the first 1 and second 51 parts. Each interface portion 4, 54 comprises a flange 5, 55 for connecting the first 1 and second 51 parts. The flanges 5, 55 are generally annular in shape as can best be seen in FIG. 3. The flanges 5, 55 abut one another, and each flange 5, 55 is provided with a plurality of apertures for the receipt of bolts, one of which is labelled with reference numeral 20. Nuts and bolts 20 are used to secure the flanges 5, 55, and therefore the first 1 and second 51 parts, together. The flanges 5, 55 are approximately 5 mm thick.

Each interface portion 4, 54 comprises an interface second portion 21, 71, which is inward of the flange. The interface portion extends radially from the interface second portion 21, 71 to the respective flange. The interface second portions are substantially annular in shape, and abut one another. The interface second portions 21, 71 are proximate to inner conduit portions 11, 61 of the first and second parts of the coupling.

Each of the first 1 and second 51 parts of the coupling 100 comprises an inner conduit portion 11, 61 in the form of a cylindrical conduit. The inner conduit portion 11, 61 interfaces with an inner tube of a vacuum-insulated pipe. Each inner conduit portion meets the other inner conduit portion at the interface portion 4, 54. Each inner conduit portion 11, 61 extends past the end of the respective outer conduit portion 41, 91, providing an easily-accessible portion of conduit for attachment to the inner pipe of a vacuum-insulated pipe.

The space 3, 53 of the respective first 1 and second 51 part is defined by the respective inner conduit portion 11, 61 and the respective outer conduit portion 41, 91. The low-pressure portion of vacuum-insulated piping interfaces with the external surface of the inner conduit portion 11, 61 and the inner wall of the outer conduit portion 41, 91.

The flat face of interface portion 4 of first part 1 is provided with an inner seal member 12 and an outer seal member 13, each being in the form of a cryogenically-compatible washer. Both the inner seal member 12 and outer seal member 13 are located in a respective annular groove (not shown) that has been formed in the flat face of interface portion 4. Both the inner seal member 12 and outer seal member 13 form a seal against the flat face of interface portion 54 of second part 51. First seal member 12 is located outward of inner conduit portion 11 and inward of outer conduit portion 41, and inhibits leakage of fluid from inner portion 14. Second seal member is located outward of outer conduit portion 41, and inhibits ingress of air.

In the embodiment above, the coupling 100 is designed to interface with a 3.5" (88.9 mm) diameter vacuum-insulated pipe.

Interface portions 4, 54 each comprise an interface second portion 21, 71 in the form of an annular wall that abut one another in the coupling. In coupling 100 the interface second portion 21, 71 is not provided with any fluid flow passages that permit fluid communication between outer portions 3, 53. It is possible to provide fluid communication between outer portions 3, 53. In such a case, a reduction in pressure in, say, outer portion 3 will lead to a reduction in pressure is outer portion 53. This allows a single vacuum pump to reduce pressure across a coupling.

As in the coupling of FIG. 2, inner conduit portion 11 comprises a projection 42 in the form of an invar cylinder that is welded to the rest of the inner conduit portion 11. Projection 42 is received by projection-receiving portion 92 of inner conduit portion 61. As cold liquid, in this case, liquid hydrogen, is passed through inner portion 14, inner conduit portions 11, 61 cool and contract. Projection-receiving portion 92 has a far greater co-efficient of thermal expansion than projection 42, and therefore contracts far more than projection 42. This brings projection-receiving portion 92 into engagement with projection 42. This may increase the effectiveness of the seal between the first and second parts, inhibiting egress of fluid from inner region 14. This engagement also reduces the risk of the unwanted decoupling of the coupling.

Figure 4:
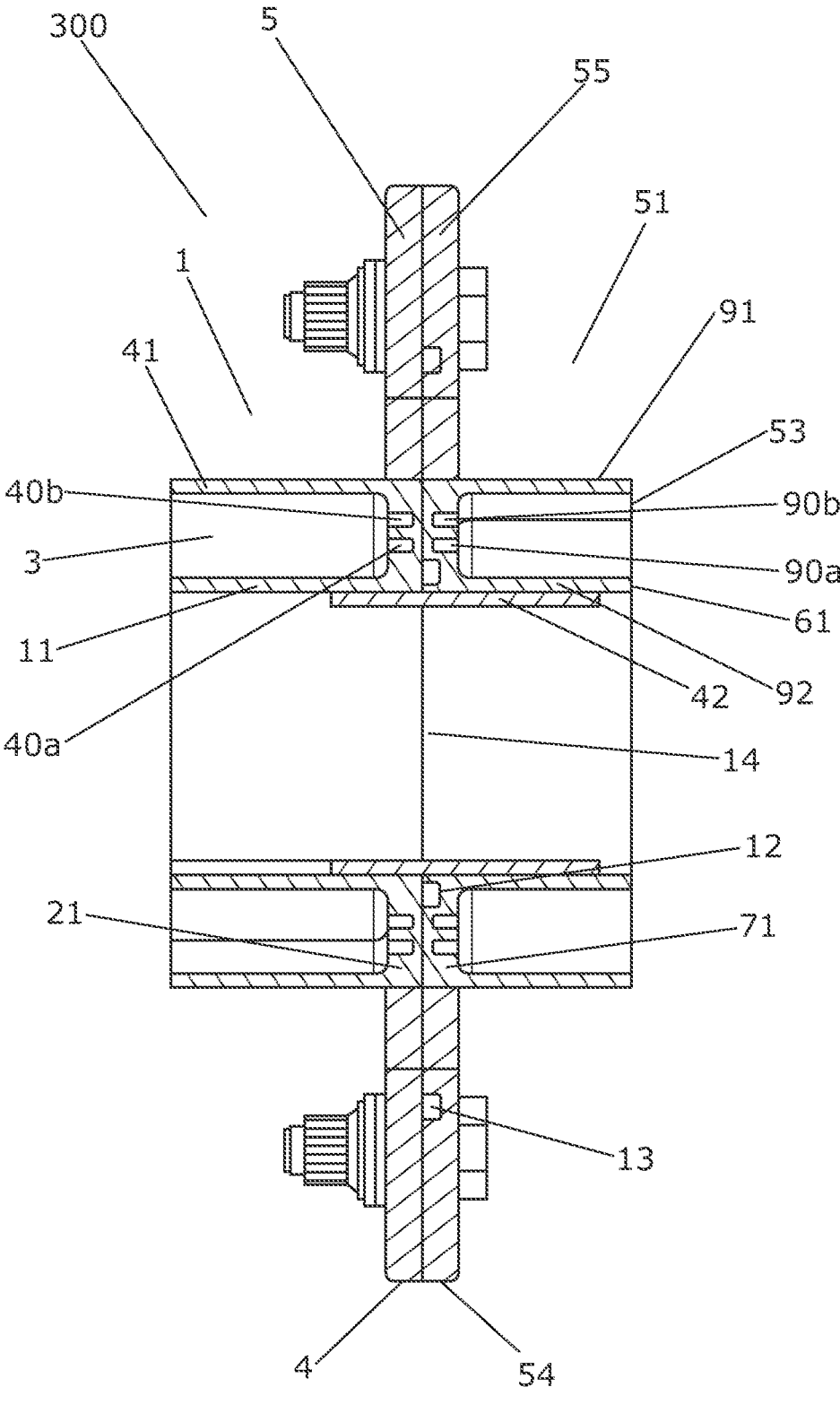
FIG. 4 shows a schematic cross-sectional view of a coupling according to a further embodiment of the invention.
Figures 5A, 5B:
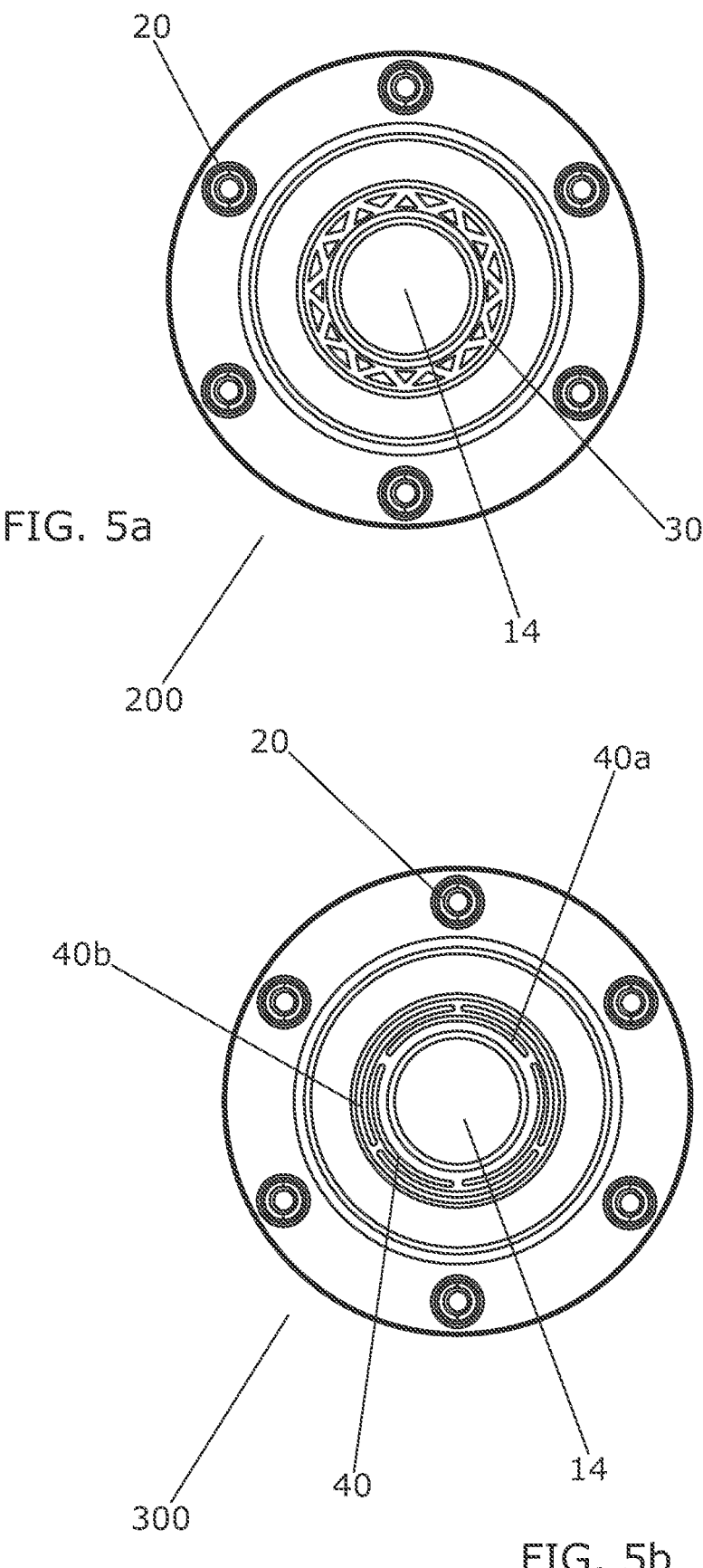
FIG. 5*a* shows an end-on view of a coupling according to another embodiment of the invention.
FIG. 5*b* shows an end-on view of a coupling according to yet another embodiment of the invention.

In the couplings of FIGS. 4, 5a and 5b there is no fluid communication between spaces 3, 53, but there is a reduction in the thickness of the second interface portions 21, 71 so that there is reduced thermal conductivity between fluid in the coupling and the ambient atmosphere. Referring to FIG. 4, coupling 300 comprises inner interface portions 21, 71 in the form of annular walls, which are provided with deep recesses 40a, b, 90a, b that extend into the annular walls. The recesses do not extend the whole way through the thickness of the respective wall and therefore there is no fluid communication between the spaces 3, 53 of first 1 and second 2 parts. The recesses may be filled with a thermally non-conductive material. FIG. 5b shows the end-on view of the coupling 300, and shows the general shape of recesses 40a, b. For the avoidance of doubt, the features depicted by reference numerals in FIGS. 4 and 5b relate to features having the same reference numerals in FIG. 3.

Alternative arrangements of recesses are possible. In this connection, FIG. 5a shows a different arrangement of recesses 30.

The examples above not only describe embodiments of couplings in accordance with the first aspect of the present invention, but also describe embodiments of first and second parts of the coupling in accordance with the second aspect of the present invention.

Various embodiments of insulated pipes (in this case, vacuum-insulated pipe) in accordance with the fourth aspect of the present invention will now be described by way of example only. Vacuum-insulated piping comprises vacuum-insulated pipe, which may be any shape (for example, straight or curved). The vacuum-insulated piping may comprise a first part of a coupling attached to one end of a pipe and another first part of a coupling attached to a second end of the pipe. The pipe may be straight or may comprise one or more bends. The pipe may be T-shaped, in which case the pipe may be provided with three first parts of a coupling.

Figure 6:
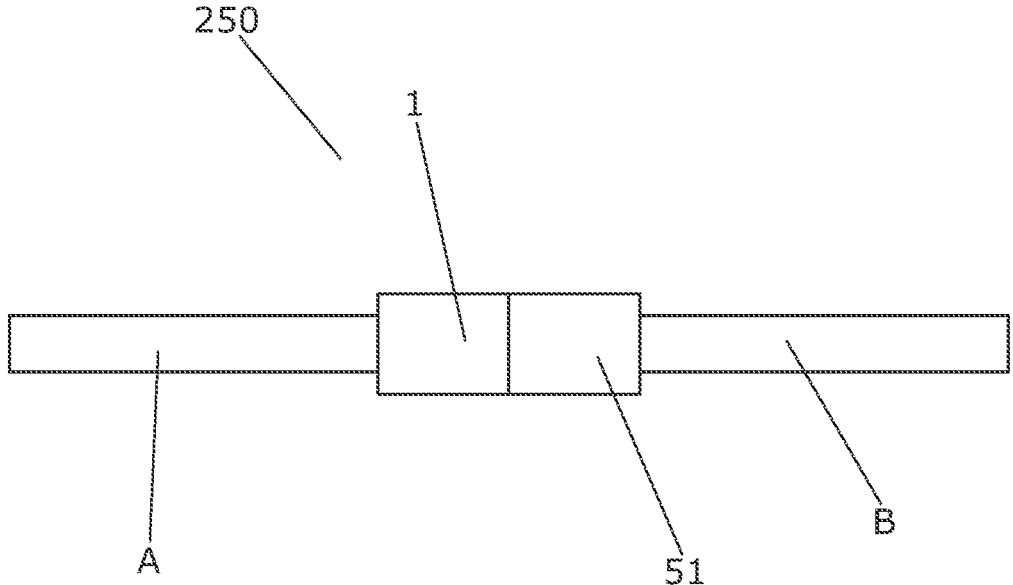
FIG. 6 shows a schematic representation of a vacuum-insulated piping arrangement according to an embodiment of the invention.

An embodiment of an insulated piping arrangement (in this case, a vacuum-insulated piping arrangement) in accordance with the fifth aspect of the present invention will now be described by way of example only with reference to FIG. 6. The piping arrangement is denoted generally by reference numeral 250, and comprises a first section of vacuum-insulated pipe A attached to first part 1 of coupling 100. A second section of vacuum-insulated pipe B is attached to second part 51 of coupling 100.

Figure 7:
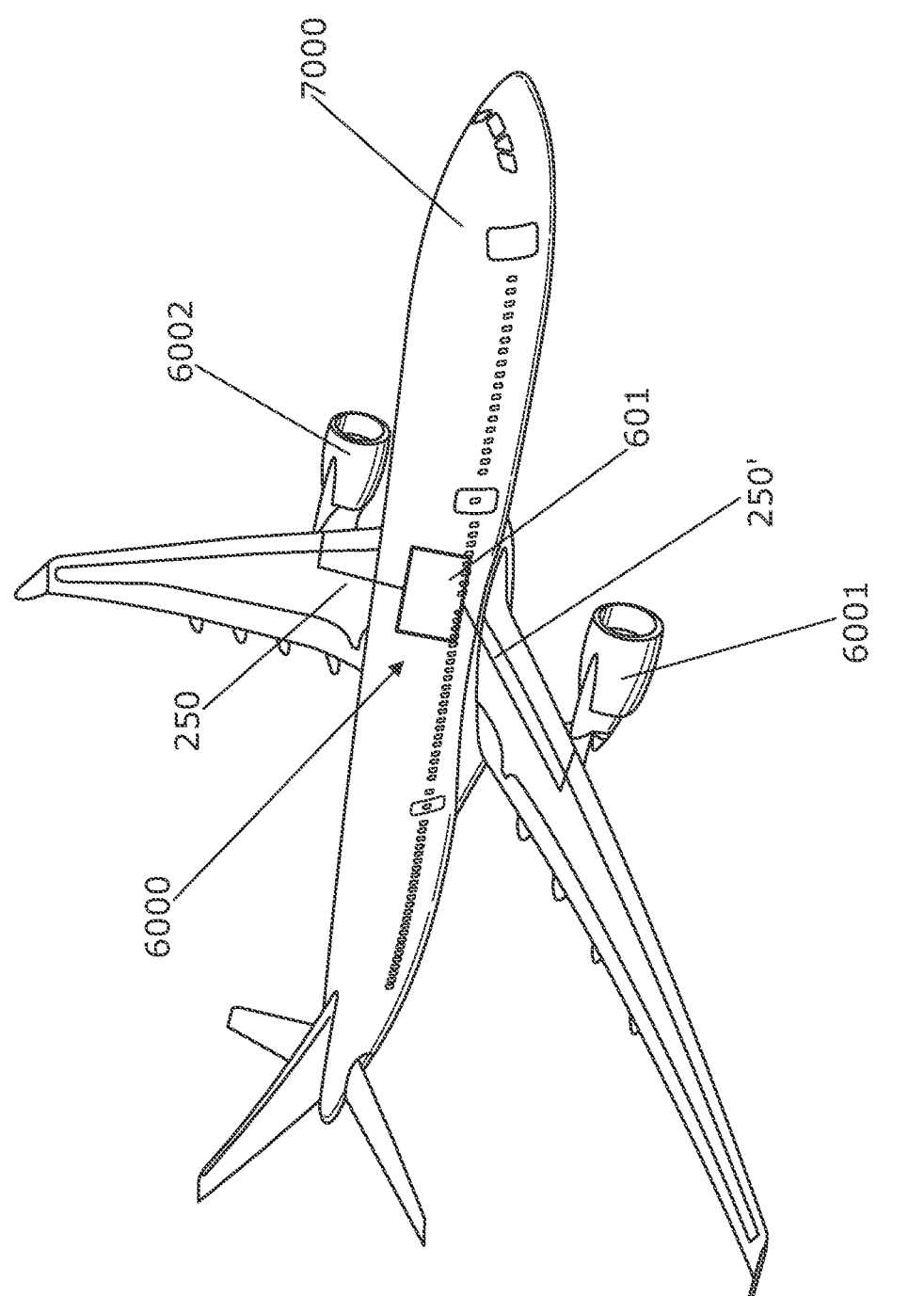
FIG. 7 shows an aircraft according to an aspect of the invention, the aircraft comprising a fuel delivery arrangement and an aircraft according to an aspect of the invention.

An embodiment of a fuel delivery arrangement in accordance with a seventh aspect of the invention will now be described by way of example only with reference to FIG. 7. A fuel delivery arrangement is denoted generally by reference numeral 6000 and comprises fuel tank 601 configured to deliver fuel to two jet engines 6001, 6002 through a vacuum-insulated piping arrangement 250, 250'. In the present case, the fuel is hydrogen. Those skilled in the art will realise that the engines 6001, 6002 are not part of the fuel delivery arrangement. FIG. 7 also shows an embodiment of a vehicle in accordance with the eighth aspect of the present invention. The vehicle, in this case a narrow bodied jet aircraft 7000 comprises fuel delivery arrangement 6000.

Figure 8:
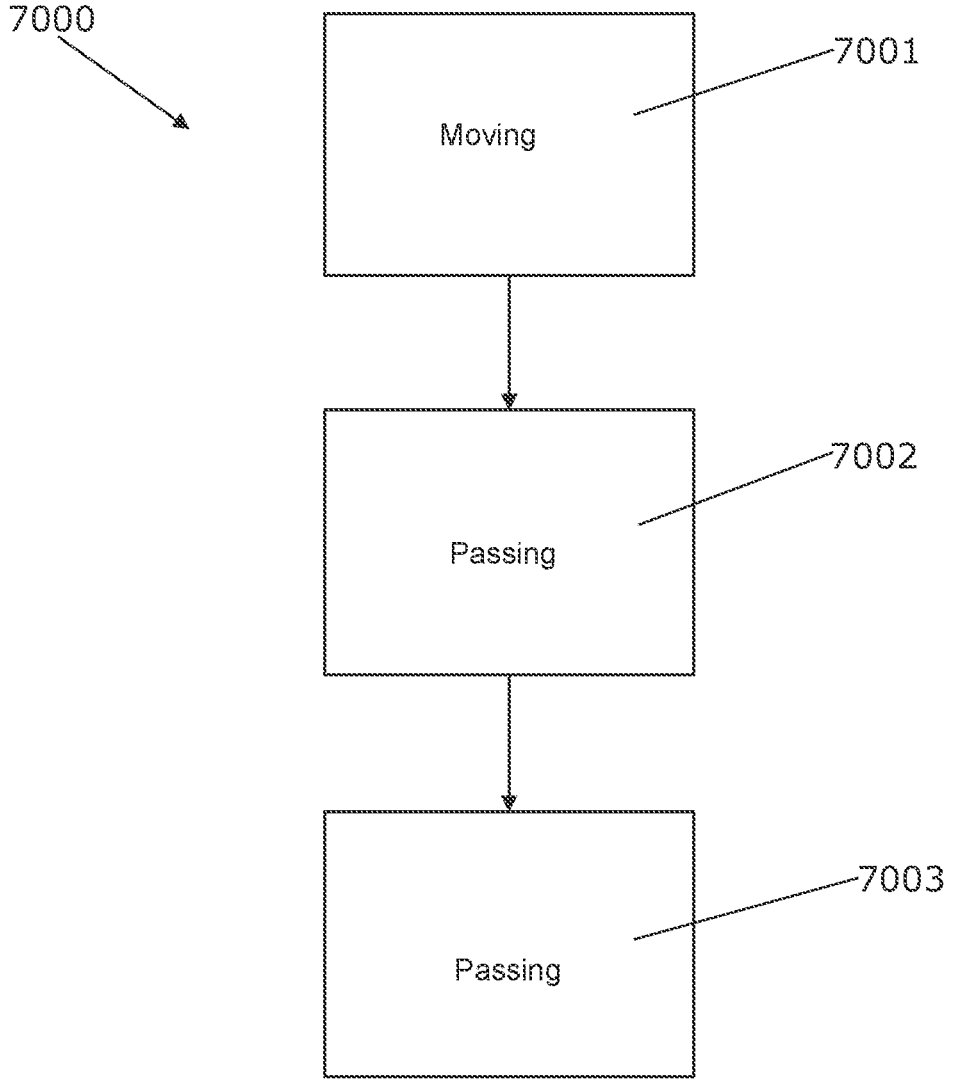
FIG. 8 shows a schematic representation of an embodiment of a method of supplying a chilled liquid fuel according to an aspect of the invention.

An embodiment of a method of supplying a chilled liquid fuel in accordance with an embodiment of the ninth aspect of the invention by way of example only will now be described with reference to FIGS. 7 and 8. The method is denoted general by reference numeral 7000, and comprises moving 7001 said chilled liquid fuel (in this case, liquid hydrogen) from a fuel tank 601, passing 7002 the chilled liquid fuel through a coupling 1, and passing 7003 the chilled liquid fuel to an engine 6001 for using the fuel.

For the avoidance of doubt, those skilled in the art will realise that the vacuum-insulated piping is not part of the coupling of the present invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The examples above describe the use of a projection comprising invar, and a projection-receiving portion comprising steel. Those skilled in the art will realise that other materials may be used.

The examples above describe how the first and second parts of the coupling are each provided with an inner conduit that is welded to an inner pipe of the vacuum-insulated pipe. Furthermore, the inner conduit may interface with the inner pipe of the vacuum-insulated pipe in a manner different from that shown above. For example, substantially the whole length of the inner conduit may receive, or be received by, the inner pipe of the vacuum-insulated pipe.

Many of the examples above describe how the sleeve is welded to the outer pipe of the vacuum-insulated pipe. Those skilled in the art will realise that other arrangements are possible. For example, substantially the whole length of the sleeve may receive the outer pipe of the vacuum-insulated pipe.

The examples above describe how the flanges of the first and second parts may be attached to one another using nuts and bolts. Those skilled in the art will realise that other means of attachment may be used. For example, one or more clamps may be used to attach the flanges together.

The examples above describes the use of a coupling for a hydrogen fuel delivery system. Those skilled in the art will realise that the coupling may be used with other vacuum-insulated pipes.

The examples above describe a coupling for vacuum-insulated piping. Those skilled in the art will realise that the coupling could be used for other insulated piping. For example, the coupling could be used in conjunction with piping that is insulated with a thermally-insulative, optionally solid, material, such as a foam (e.g. polyurethane foam or glass foam), Aerogel or microspheres, such as glass microspheres Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A coupling for insulated piping, the coupling comprising:

first and second parts for forming the coupling;

each of the first and second parts comprising an inner conduit portion for fluid communication with an inner tube of an insulated pipe and an outer conduit portion, the inner conduit portion and outer conduit portion forming therebetween a space for fluid communication with an insulating part of the insulated pipe;

the inner conduit portions of the first and second parts being suitable for forming an inner region for the passage of fluid therethrough;

each of the first and second parts comprising an interface portion including a flange for connecting the first and second parts, the inner conduit portion of the first part comprising a projection comprising a lower thermal expansion region having a first co-efficient of thermal expansion;

the second part comprising a projection-receiving portion for receiving the projection of the first part, the projection-receiving portion having a second co-efficient of thermal expansion, the second co-efficient of thermal expansion being greater than the first co-efficient of thermal expansion; and, wherein the projection comprises a tip portion welded to a base portion, and directly extending from the interface portion of the first part, and wherein the tip portion projects into the projection-receiving portion of the second part.

2. The coupling according to claim 1, wherein the projection and projection-receiving portion are configured so that the projection-receiving portion engages the projection when cooled to a temperature of no more than −200° C.

3. The coupling according to claim 1, wherein the projection-receiving portion has a coefficient of thermal expansion of at least $8\times10^{-6}K^{-1}$.

4. The coupling according to claim 3, wherein the lower thermal expansion region of the projection has a coefficient of thermal expansion of no more than $2\times10^{-6}K^{-1}$.

5. The coupling according to claim 1 wherein the inner conduit portion of the second part comprises a non-receiving portion that does not receive the projection, and the projection-receiving portion.

6. The coupling according to claim 5, wherein a cross-sectional area, diameter and/or shape of the projection-receiving portion are different from that or those of the non-receiving portion.

7. The coupling according to claim 1, wherein a cross-sectional area, diameter and/or shape of the projection is the same as that or those of a non-projection portion of the inner conduit portion of the first part.

8. The coupling according to claim 1, wherein the projection forms the lower thermal expansion region, wherein the base portion comprises a material different from the end or the tip portion, said material of the base portion having a thermal co-efficient of thermal expansion that is greater than the lower thermal expansion region.

9. An insulated piping arrangement comprising first and second insulated pipes connected by the coupling in accordance with claim 1.

10. A fuel delivery arrangement comprising one or more fuel tanks configured to deliver fuel to an engine or motor through an insulated piping arrangement according to claim 9.

11. A vehicle comprising an insulated piping arrangement in accordance with claim 9.

12. A method of supplying a chilled liquid fuel, the method comprising passing said chilled liquid fuel through a coupling in accordance with claim 1.

13. A coupling for insulated piping, the coupling comprising:

first and second parts for forming the coupling;

each of the first and second parts comprising an inner conduit portion for fluid communication with an inner tube of an insulated pipe and an outer conduit portion, the inner conduit portion and outer conduit portion forming therebetween a space for fluid communication with an insulating part of the insulated pipe;

the inner conduit portions of the first and second parts being suitable for forming an inner region for the passage of fluid therethrough;

each of the first and second parts comprising an interface portion including a flange for connecting the first and second parts, the inner conduit portion of the first part comprising a projection comprising a lower thermal expansion region having a first co-efficient of thermal expansion;

the second part comprising a projection-receiving portion for receiving the projection of the first part, the projection-receiving portion having a second co-efficient of thermal expansion, the second co-efficient of thermal expansion being greater than the first co-efficient of thermal expansion;

wherein the projection comprises a tip portion welded to a base portion, and directly extends from the interface portion of the first part, and projects into the projection-receiving portion of the second part; and, a first seal member disposed outward of the inner conduit portions and a second seal member disposed outward of the outer conduit portions.

14. A coupling for insulated piping, the coupling comprising:

first and second parts for forming the coupling;

each of the first and second parts comprising an inner conduit portion for fluid communication with an inner tube of an insulated pipe and an outer conduit portion, the inner conduit portion and outer conduit portion forming therebetween a space for fluid communication with an insulating part of the insulated pipe;

the inner conduit portions of the first and second parts being suitable for forming an inner region for the passage of fluid therethrough;

each of the first and second parts comprising a flange for connecting the first and second parts, the inner conduit portion of the first part comprising a projection comprising a lower thermal expansion region having a first co-efficient of thermal expansion;

the second part comprising a projection-receiving portion for receiving the projection of the first part, the projection-receiving portion having a second co-efficient of thermal expansion, the second co-efficient of thermal expansion being greater than the first co-efficient of thermal expansion; and, wherein the first part comprises an interface region for forming an interface with a corresponding region of the second part, the interface region comprising the flange;

wherein the projection comprises a tip portion welded to a base portion, and directly extends from the interface region of the first part;

wherein the second part comprises an interface region for forming an interface with a corresponding region of the first part, the interface region comprising the flange;

wherein the projection-receiving portion extends from the interface region of the second part; and, wherein the coupling comprises first and second seal-forming members.

* * * * *